US011467824B2

(12) United States Patent
Yang et al.

(10) Patent No.: US 11,467,824 B2
(45) Date of Patent: Oct. 11, 2022

(54) METHOD AND SYSTEM FOR FAST BUILDING AND TESTING SOFTWARE

(71) Applicant: VMware, Inc., Palo Alto, CA (US)

(72) Inventors: Yang Yang, Shanghai (CN); Yang Yang, Shanghai (CN); Zhou Huang, Shanghai (CN); RunQing Li, Shanghai (CN); Jin Feng, Shanghai (CN); Wenguang Wang, Santa Clara, CA (US); He Kun Wang, Shanghai (CN); Xinyu Zhang, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/994,681

(22) Filed: Aug. 17, 2020

(65) Prior Publication Data

US 2021/0406001 A1 Dec. 30, 2021

(30) Foreign Application Priority Data

Jun. 30, 2020 (WO) ................ PCT/CN2020/099282

(51) Int. Cl.
*G06F 8/71* (2018.01)
*G06F 8/41* (2018.01)
*G06F 11/36* (2006.01)

(52) U.S. Cl.
CPC ............... *G06F 8/71* (2013.01); *G06F 8/433* (2013.01); *G06F 11/3664* (2013.01); *G06F 11/3688* (2013.01)

(58) Field of Classification Search
None
See application file for complete search history.

(56) References Cited

U.S. PATENT DOCUMENTS

| 6,401,220 | B1* | 6/2002 | Grey | G06F 11/263 |
| | | | | 717/124 |
| 8,020,037 | B1* | 9/2011 | Schwartz | G06F 11/2094 |
| | | | | 714/41 |
| 8,392,896 | B2* | 3/2013 | Stone | G06F 8/00 |
| | | | | 717/140 |
| 10,031,838 | B2* | 7/2018 | Collier | G06F 8/10 |
| 10,067,860 | B2* | 9/2018 | Sharda | G06F 11/3688 |
| 2009/0300423 | A1* | 12/2009 | Ferris | G06F 11/36 |
| | | | | 714/38.1 |

(Continued)

OTHER PUBLICATIONS

GNU, "Gnu Make", Jan. 19, 2020, GNU.org (Year: 2020).*

(Continued)

*Primary Examiner* — Hossain M Morshed
(74) *Attorney, Agent, or Firm* — Su IP Consulting

(57) ABSTRACT

Example methods are provided for performing fast building and testing a software suite with multiple software components. In one example, the method may include obtaining a changed code file, identifying a software component of the software suite impacted by the changed code file, and instructing to generate a software component build based on the software component but excluding other software components of the software suite. Before completing generating the software component build, the method may also include selecting a software suite build. The method further includes instructing to prepare a testbed based on the software suite build and instructing to test the software component build on the testbed.

21 Claims, 5 Drawing Sheets

(56) References Cited

U.S. PATENT DOCUMENTS

| | | | | |
|---|---|---|---|---|
| 2012/0192153 A1* | 7/2012 | Venkatraman | ...... | G06F 11/3664 |
| | | | | 717/124 |
| 2012/0266135 A1* | 10/2012 | Mansour | ............. | G06F 11/3688 |
| | | | | 717/124 |
| 2014/0380278 A1* | 12/2014 | Dayan | ................. | G06F 11/3688 |
| | | | | 717/124 |
| 2018/0253296 A1* | 9/2018 | Brebner | .................... | G06F 8/73 |
| 2020/0327045 A1* | 10/2020 | Wang | .................. | G06F 11/3684 |
| 2020/0401504 A1* | 12/2020 | Sommers | ............ | G06F 11/3664 |
| 2021/0311859 A1* | 10/2021 | De Sousa Bispo | ..... | G06F 9/541 |

OTHER PUBLICATIONS

CSL, "Generating Multiple Targets", 2001, Published by www.csl.mtu.edu (Year: 2001).*

GNU, "GNU make file", 2020, https://www.gnu.org/software/make/ (Year: 2020).*

CLS, "Generating Multiple Targets", 2013, https://www.csl.mtu.edu/cs4411.ck/www/NOTES/make/multiple.html (Year: 2013).*

* cited by examiner

METHOD AND SYSTEM FOR FAST BUILDING AND TESTING SOFTWARE

CROSS-REFERENCE TO RELATED APPLICATION

The present application claims the benefit of Patent Cooperation Treaty (PCT) Application No. PCT/CN2020/099282, filed Jun. 30, 2020. The PCT Application is incorporated herein by reference.

BACKGROUND

Unless otherwise indicated herein, the approaches described in this section are not admitted to be prior art by inclusion in this section.

Virtualization software suite for implementing and managing virtual infrastructure objects may include (1) hypervisor software component that implements virtual machines (VMs) on physical hosts, (2) virtual storage area network (vSAN) software component that aggregates local storage to form a shared datastore for a cluster of hosts, and (3) a management server software component that centrally provisions and manages virtual datacenters, VMs, hosts, clusters, datastores, and virtual networks.

Conventionally, when programmers make changes to one software component of the virtualization software suite, such changes may start with changing a word in a line of a human readable code of the software component to generate a changed code file. Because the hypervisor software component, the vSAN software component, the management server software component and other components of the virtualization software suite are tightly coupled, even when the changes are minor (e.g., a single line of human readable code), a build still needs to be performed for the entire virtualization software suite to convert the changed code file to executable code.

After the build of the entire virtualization software suite is completed in response to the minor changes, programmers may then prepare a testbed to run the executable code of the entire virtualization software suite on one or more physical or virtual machines. In other words, in response to making minor changes to one software component in the virtualization software suite, this conventional approach requires two-serial-step operations, e.g., building the virtualization software suite and preparing the testbed, and such serial-step operations may take a long time to complete.

DETAILED DESCRIPTION

Figure 1:
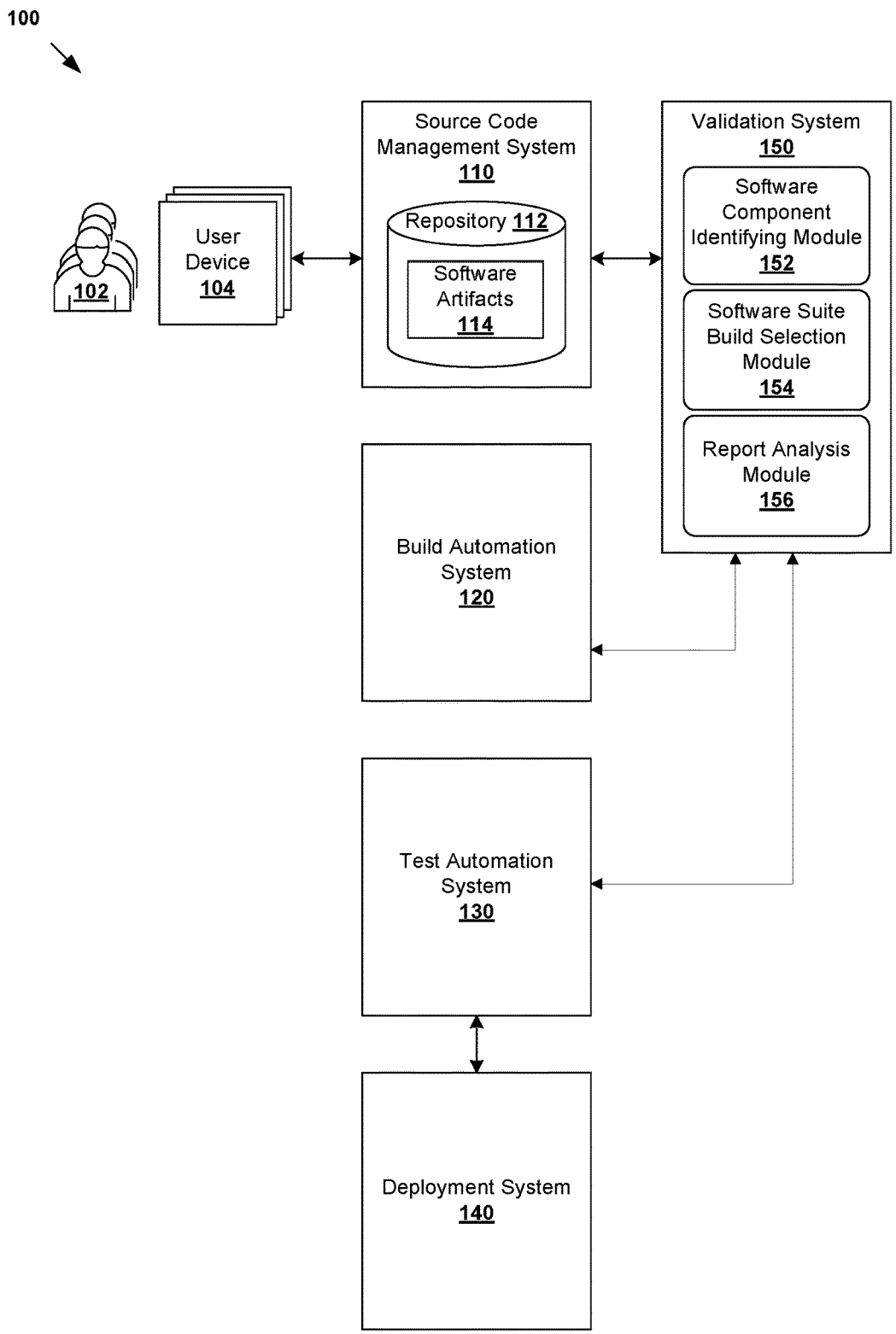
FIG. 1 is a schematic diagram illustrating an example computing environment in which software build and test may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

In the disclosure, a "build" refers to a process for converting source code files into standalone software artifact(s) that can be executed on a computing device, or the result or output of doing so. In some examples, a "build" may refer to the resulting executable code ready for testing. A "build target" refers to a file built from one or more source code files. A "branch" is a copy of a code file, managed in a version control system. "Branching" refers to a process of duplicating an object under version control so that modifications to the object can occur in parallel along multiple branches.

Challenges relating to software development will now be explained using FIG. 1, which is a schematic diagram illustrating example computing environment 100 in which code validation may be performed. It should be understood that, depending on the desired implementation, computing environment 100 may include additional and/or alternative components than that shown in FIG. 1.

In the example in FIG. 1, computing environment 100 includes source code management system 110, build automation system 120, test automation system 130 and deployment system 140 to facilitate software development and delivery. In practice, any software development and delivery process may be used. In practice, systems 110-140 may be implemented using one or more physical machine(s) and/or virtualized computing instance(s).

In the example in FIG. 1, source code management system 110 is configured to manage software artifacts 114 stored in repository 112 accessible by users 102 via user devices 104. As used herein, the term "software artifact" may refer generally to an item that is produced during software development, such as source code file(s), configuration files, tools, libraries, etc. Source code management system 110 generally includes a version control tool (not shown for simplicity) to store a complete file and metadata history for each software artifact to the retrieval of a particular version of the software artifact. During a software development phase, users 102 may access (i.e., check out) software artifacts 114 to perform any necessary modification and/or review, before committing (i.e., check in) software artifacts 114 into repository 112.

Build automation system 120 is configured to automate software build. Here, the term "software build" may refer generally to a process for converting the software artifact(s) 114 to executable code data, or a result or output thereof. For example, a software build may involve accessing software artifacts 114 in repository 112, compiling software artifacts 114 into the executable code data and linking objects together to perform intended functions. Example executable code data that can be run on a machine may include such as program libraries, build files, compiled source code files, configuration files, any combination thereof, etc.

Test automation system 130 is configured to automate preparations of a testbed and software testing of software builds produced by build automation system 120 on the testbed. Any suitable tests may be performed, such as unit testing, integration testing, security testing, application programming interface (API) testing, system testing, performance testing, etc. In practice, for example, integration and system testing may occur in a staging environment before a software product is released into a production environment using deployment system 140.

In most cases, the complexity of software artifacts 114 makes it difficult to predict the impact of modifications made to software artifacts 114 before the modifications are performed and a few automated tests are run. In practice, these tests may take several hours (e.g., 3-4 hours). If the software build fails the tests, additional time and effort is required to identify the relevant defects, generate software builds and re-run the tests. These efficiencies are exacerbated when the software product involves the integration of a large number of software artifacts 114.

According to examples of the present disclosure, software build and test may be performed using validation system 150 ("computer system") to improve software development quality and efficiency. To illustrate, validation system 150 in FIG. 1 implements software component identifier module 152 to identify a software component of a software suite, software suite build selection module 154 to select a software suite build from cached software suite builds, and report analysis module 156 to analyze a test report log from test automation system 130.

Figure 2:
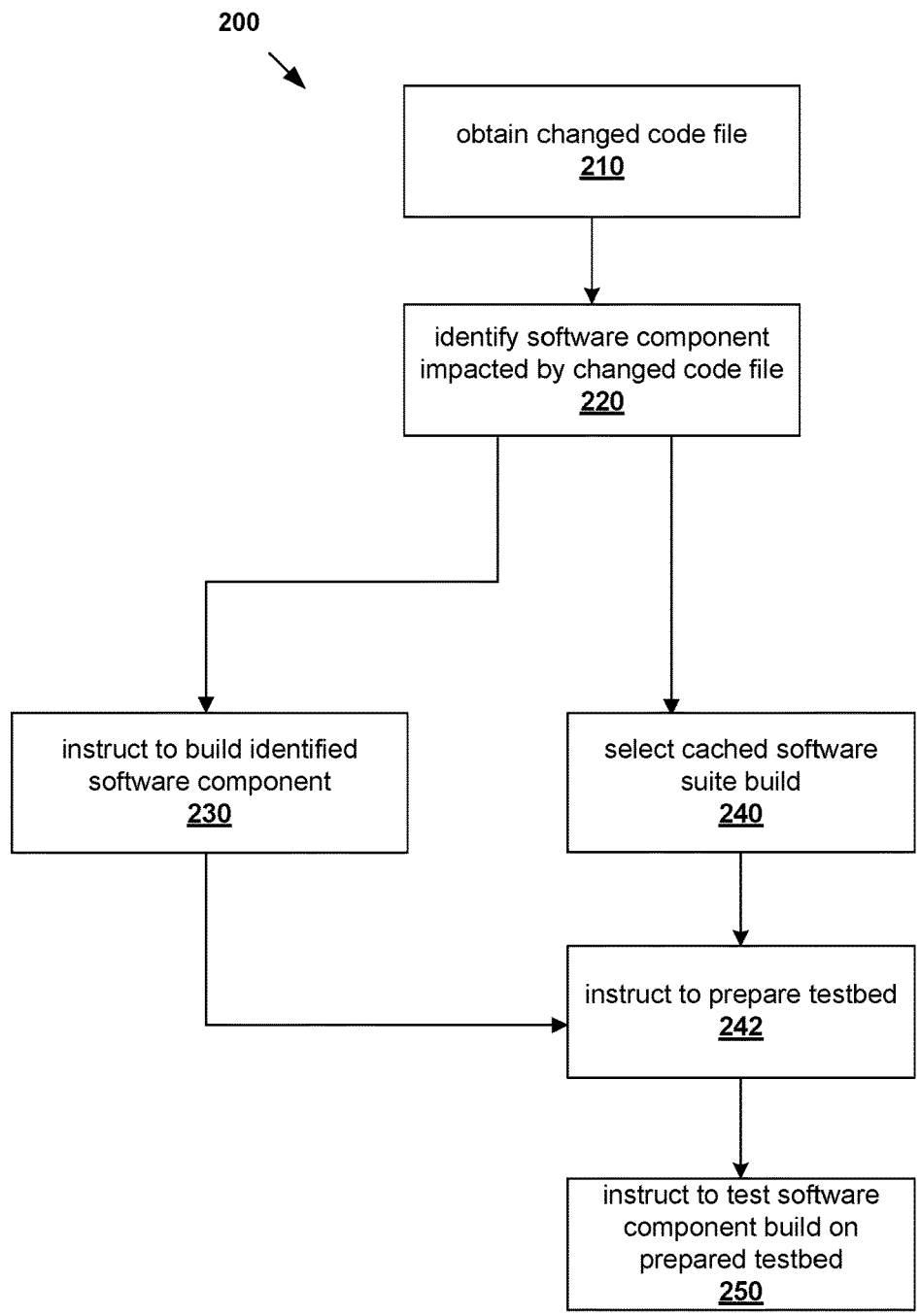
FIG. 2 is a flowchart of example process for a computer system to perform software build and test.

In more detail, FIG. 2 is a flowchart of example process 200 for a computer system to perform software build and test. Example process 200 may include one or more operations, functions, or actions illustrated by one or more blocks, such as 210 to 250. The various blocks may be combined into fewer blocks, divided into additional blocks, and/or eliminated depending on the desired implementation. Example process 200 may be performed by any suitable "computer system," such as validation system 150 in FIG. 1.

At block 210 in FIG. 2, a changed code file is obtained.

Block 210 may be followed by block 220. In some embodiments, a dependency graph of a build target to source code files may be obtained by a construction tool (e.g., GNU Make or SCons). Based on the dependency graph, the build target of the changed code file may be determined. In response to the build target being a part of a software component (e.g., vSAN software component) of a software suite (e.g., virtualization software suite), the software component is identified as being impacted by the changed code file obtained at block 210.

More specifically, the following human readable code may be used in block 220.

---

Input : Branch name (branchName)
Output : Map from code file to build target (map)
  1. map ← EmptyMap
  2. For buildTarget in GetAllComponentBuildTargets(branchName)
  3.    dependencyGraph ← GetDependencyGraph(branchName, buildTarget)
  4.    For node in GetAllNodesInGraph(dependencyGraph)
  5.      If GetCodeFilePath(node) in codeRepository Then
  6.        map[GetCodeFilePath(node)].append(buildTarget)
  7.      EndIf
  8.    EndFor
  9. EndFor
 10. Return map

---

The code in Line 2 set forth may refer to obtaining all build targets in a branch. The code in Line 3 may refer to obtaining one or more dependency graphs corresponding to each of the all build targets. In the example code set forth above, a "node" may refer to a code file, an intermediate file from a source code file to a build target, or a build target. The code in Line 4 may refer to identifying one or more nodes in the dependency graphs. The code in Line 5 may refer to identifying one or more nodes in a code repository corresponding to changes made by a user. The code in Line 6 may refer to mapping the nodes identified in Line 5, which on the dependency graph of Lines 3 and 4, to a build target at the end of the dependency graph.

Block 220 may be followed by blocks 230 and 240. At block 230 in FIG. 2, process 200 instructs to generate a software component build based on the software component identified at block 220. In other words, at block 230, the software component build generated in process 200 includes the software component identified at block 220 but excludes other software components of the software suite. Block 230 may be followed by block 242, which will be further described below.

At block 240 in FIG. 2, process 200 selects a cached software suite build. The selection is before the build of the software component at block 230 completes. Preparations of the cached software suite build will be further described in details below along FIG. 3. Block 240 may be followed by block 242. At block 242 in FIG. 2, process 200 instructs to prepare a testbed based on the cached software suite build selected at block 240 and the software component build generated at block 230.

At block 242, the cached software suite build prepared at block 240 is installed on a given environment on a physical machine or a virtual machine. After the cached software suite build is installed, the software component build generated at block 230 is also installed on the cached software suite build to take effect of the changed code file at block 210 in the given environment.

Compared to conventional two-step in series process of the software build and the testbed preparation, block 240 is before the build of the software component at block 230 completes. In other words, block 240 may be performed in parallel in time with block 230. Therefore, the total time of the software component build and the testbed preparation is reduced.

Block 242 may be followed by block 250. At block 250, process 200 instructs to test software component build generated at block 230 on testbed prepared at block 240.

Figure 3:
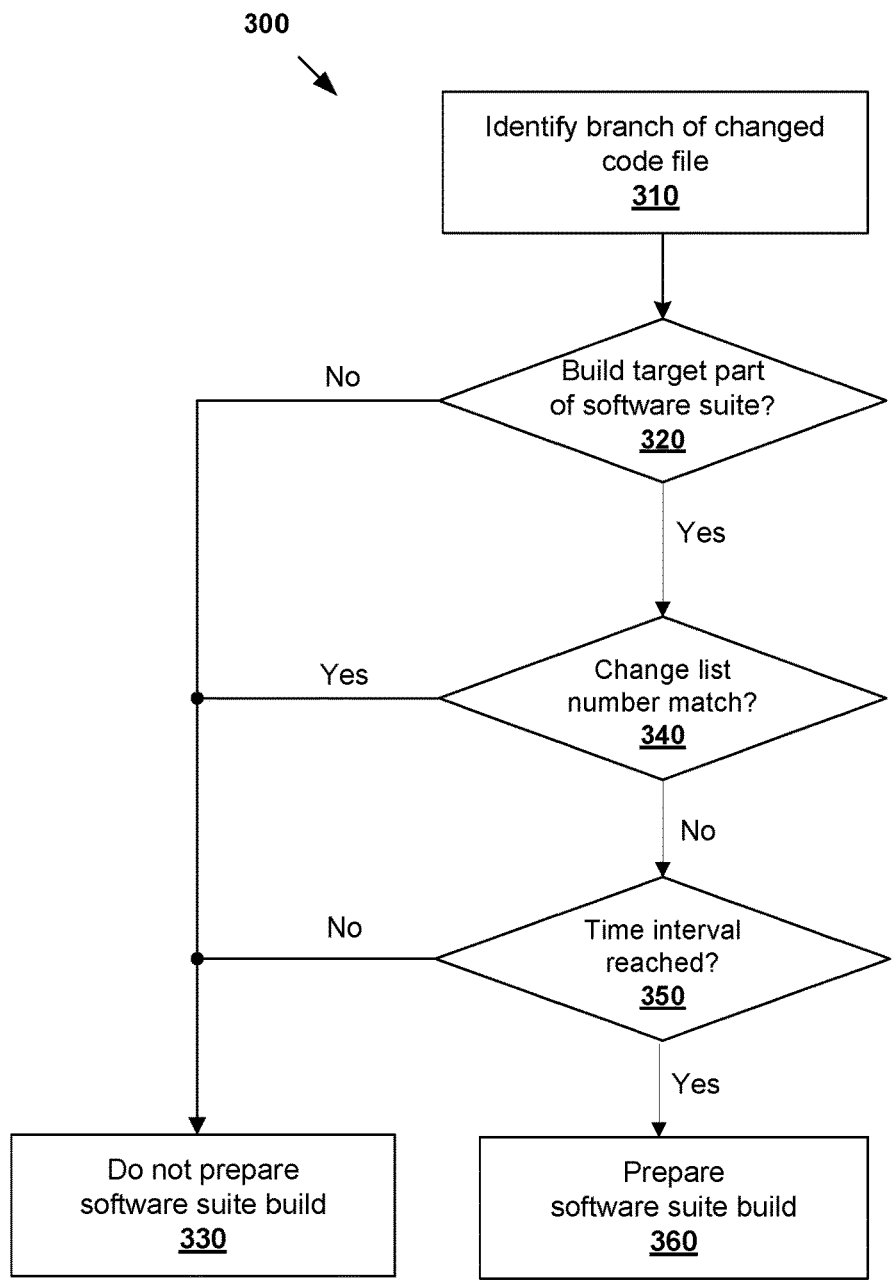
FIG. 3 is a flowchart of example process for a computer system to prepare and cache a software suite build.

FIG. 3 is a flowchart of example process 300 for a computer system to prepare and cache a software suite build. Example process 300 may include one or more operations, functions, or actions illustrated by one or more blocks, such as 310 to 360. The various blocks may be combined into fewer blocks, divided into additional blocks, and/or eliminated depending on the desired implementation. Example process 300 may be performed by any suitable "computer system," such as validation system 150 in FIG. 1.

At block 310 in FIG. 3, in response to obtaining a changed code file, a branch of the changed code file obtained at block 210 is identified. In some embodiments, the changed code file may include a change list number, which is a string to identify code changes in the changed code file. A string is a sequence of characters. In some embodiments, the branch of the changed code file is identified based on the latest change list number in the changed code file.

Block 310 may be followed by block 320. At block 320 in FIG. 3, process 300 determines whether a build target of the branch is a part of the software suite. In response a determination that the build target of the branch is not a part of the software suite, block 320 may be followed by block 330. At block 330 in FIG. 3, process 300 does not prepare a new software suite build (e.g., a second software suite build).

In response to a determination that the build target of the branch is a part of the software suite, block 320 may be followed by block 340. At block 340 in FIG. 3, process 300 determines whether the latest change list number identified at block 310 matches a first change list number associated with a first software suite build cached in a repository.

In some embodiments, the first software suite build is built from a first code file including the first change list number. During the building, meta data of the building may be saved in a database. The meta data may include, but not limited to, a timestamp of the first software suite build, the first change list number, and uniform resource identifiers of a package of the first software suite build. In some embodiments, a sanity test is performed on the first software suite build before the first software suite build can be cached in the repository.

In response to determining that the latest change list number identified at block 310 matches the first change list number, block 340 may be followed by block 330.

In response to determining that the latest change list number identified at block 310 does not match the first change list number, block 340 may be followed by block 350. At block 350 in FIG. 3, process 300 determines whether a time difference is reached. In response to determining that the time difference is not reached, block 350 may be followed by block 330.

In response to determining that the time difference is reached, block 350 may be followed by block 360. At block 360 in FIG. 3, process 300 prepares a new software suite build (e.g., a second software suite build). In response to the new software suite build passes the sanity test, process 300 caches the new software suite build in the repository.

In some embodiments, the time difference is a difference between a first time interval and a second time interval. In some embodiments, the first time interval is a time interval between the present time of the computer system performing the process 300 and the timestamp of the first software suite build. In some embodiments, the second time interval is a function of a maximum predetermined time interval and a difference between the latest change list number identified at block 310 and the first change list number. The second time interval may be expressed in equations 1 and 2 below.

$$Secondtimeinterval = maxTimeInterval - \alpha \times clnGap \quad \text{Equation 1}$$

$$Secondtimeinterval = \frac{maxTimeInterval}{\beta} \quad \text{Equation 2}$$

In response to $$clnGap < \left(\alpha - \frac{\alpha}{\beta}\right) maxTimeInterval,$$

equation 1 applies. In response to $$clnGap \geq \left(\alpha - \frac{\alpha}{\beta}\right) maxTimeInterval,$$

equation 2 applies. In some embodiments, $\alpha$, $\beta$, maxTimeInterval may be configured by a system administrator to determine a frequency that a new software suite build should be built.

Figure 4:
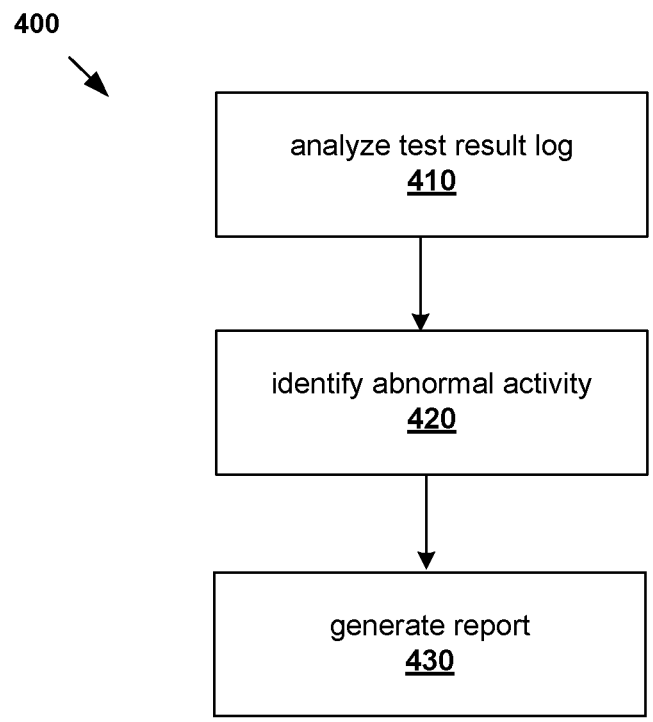
FIG. 4 is a flowchart of example process for a computer system to analyze a test result of a test automation system.

FIG. 4 is a flowchart of example process 400 for a computer system to analyze a test result of a test automation system (e.g., test automation system 130 in FIG. 1). Example process 400 may include one or more operations, functions, or actions illustrated by one or more blocks, such as 410 to 430. The various blocks may be combined into fewer blocks, divided into additional blocks, and/or eliminated depending on the desired implementation. Example process 400 may be performed by any suitable "computer system," such as validation system 150 in FIG. 1.

At block 410 in FIG. 4, in conjunction with FIG. 1, in response to receiving a test result log from test automation system 130, process 400 analyzes the test result log. The test result log may include information associated with the software component build and information associated with the software suite build used in one or more tests.

Block 410 may be followed by block 420. At block 420 in FIG. 4, one or more abnormal activities are identified from the test result log. Some example abnormal activities include, but not limited to, an out-of-date software suite build, an empty value of a test result and a failed test result.

In some embodiments, an out-of-date software suite build refers to a software suite build having been built over a predetermined time (e.g., two days). The use of an out-of-date software suite build in a test may indicate that there is an error in building the software suite, which causes no updated (e.g., built within two days) software suite build was used in the test.

In some embodiments, an empty value of a test result refers to failing to install a software component build on a software suite build. It may suggest an error in building the software component.

In some embodiments, a failed test result may be caused manual errors, a broken change list number or a broken identified branch.

Block 420 may be followed by block 430. At block 430 in FIG. 4, in conjunction with FIG. 1, a proactive report is generated to users 102. The proactive report may include the abnormal activities identified at block 420 to alert the users 102 to take further actions.

Computer System

Figure 5:
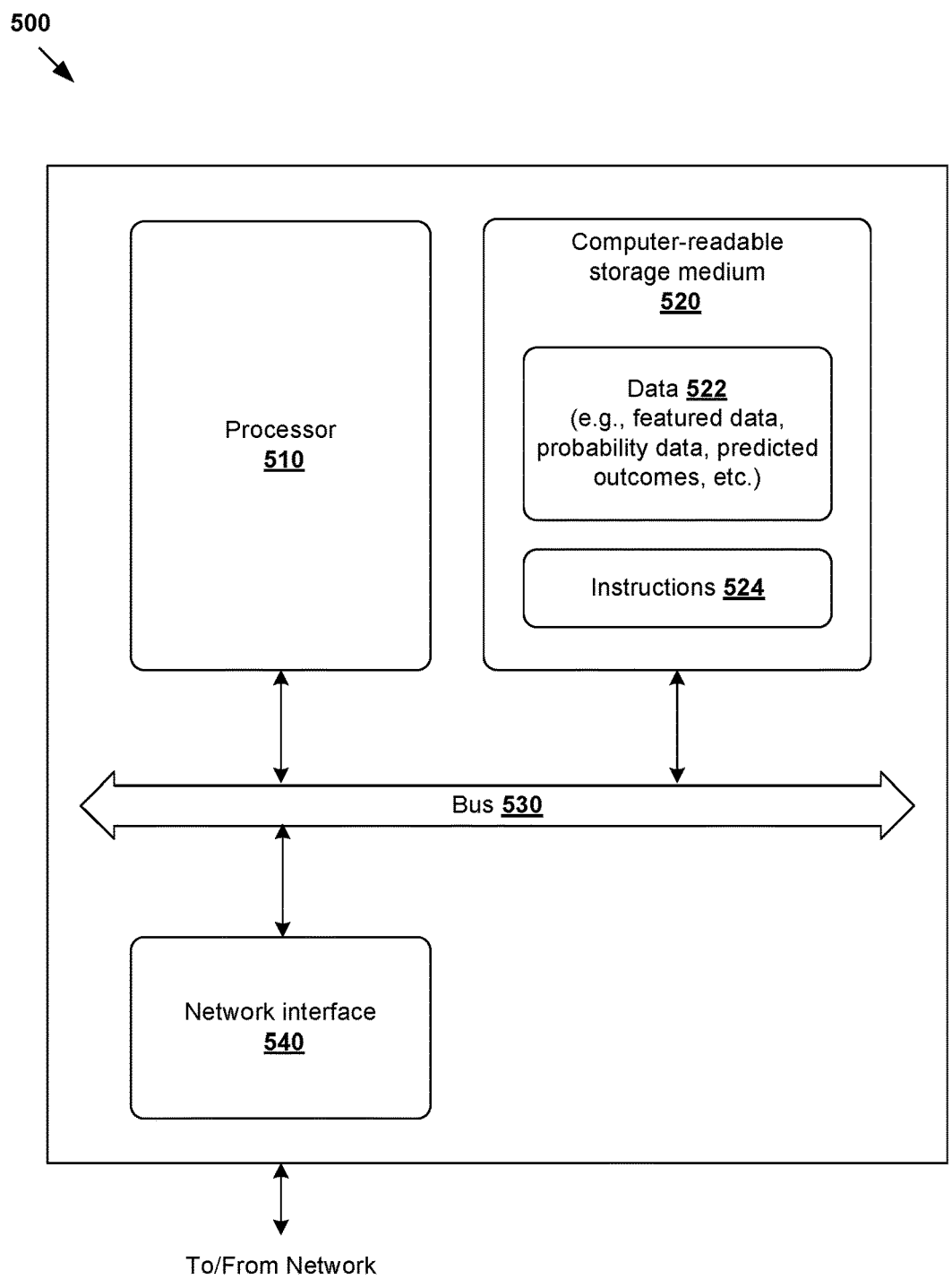
FIG. 5 is a schematic diagram illustrating an example computer system to perform software build and test.

The above examples can be implemented by hardware (including hardware logic circuitry), software or firmware or a combination thereof. FIG. 5 is a schematic diagram illustrating example computer system 500 to perform software build and test. In some embodiments, example computer system 500 corresponds to validation system 150 in FIG. 1. Example computer system 500 may include processor 510, computer-readable storage medium 520, network interface 540, and bus 530 that facilitates communication among these illustrated components and other components.

Processor 510 is to perform processes described herein with reference to the drawings. Computer-readable storage medium 520 may store any suitable data 522, such as feature data, probability data, prediction outcomes, etc. Computer-readable storage medium 520 may further store computer-readable instructions 524 ("program code") that, in response to execution by processor 510, cause processor 510 to perform processes described herein with reference to FIG. 2 to FIG. 4.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one skilled in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform fast building and testing a software suite with multiple software components, the method comprising:
    obtaining a changed code file;
    identifying a software component of the software suite impacted by the changed code file;
    instructing to generate a software component build based on the software component but excluding other software components of the software suite;
    before completing generating the software component build, selecting a software suite build; and
    instructing to prepare a testbed based on the software suite build; and
    instructing to test the software component build on the testbed.

2. The method of claim 1, wherein the instructing to prepare the testbed is performed after completing generating the software component build.

3. The method of claim 1, wherein the identifying the software component is based on a dependency graph of a build target of the changed code file.

4. The method of claim 1, wherein the selecting the software suite build further comprises identifying a branch of the changed code file based on a latest change list number included in the changed code file.

5. The method of claim 4, further comprising:
    determining that a build target of the branch is a part of the software suite; and
    generating and caching a new software suite build.

6. The method of claim 4, further comprising:
    determining that the latest change list number included in the changed code file does not match a change list number associated with the software suite build; and
    generating and caching a new software suite build.

7. The method of claim 6, further comprising:
    calculating a time interval which is a function of a difference between the latest change list number included in the changed code file and the change list number associated with the software suite build; and
    generating and caching the new software suite build based on the calculated time interval.

8. A non-transitory computer-readable storage medium that includes a set of instructions which, in response to execution by a processor of a computer system, cause the processor to perform a method for fast building and testing a software suite with multiple software components, the method comprising:
    obtaining a changed code file;
    identifying a software component of the software suite impacted by the changed code file;
    instructing to generate a software component build based on the software component but excluding other software components of the software suite;
    before completing generating the software component build, selecting a software suite build; and
    instructing to prepare a testbed based on the software suite build; and
    instructing to test the software component build on the testbed.

9. The non-transitory computer-readable storage medium of claim 8, wherein the instructing to prepare the testbed is performed after completing generating the software component build.

10. The non-transitory computer-readable storage medium of claim 8, wherein the identifying the software component is based on a dependency graph of a build target of the changed code file.

11. The non-transitory computer-readable storage medium of claim 8, wherein the selecting the software suite build further comprises identifying a branch of the changed code file based on a latest change list number included in the changed code file.

12. The non-transitory computer-readable storage medium of claim 11, wherein the method further comprising:
    determining that a build target of the branch is a part of the software suite; and
    generating and caching a new software suite build.

13. The non-transitory computer-readable storage medium of claim 11, wherein the method further comprising:
  determining that the latest change list number included in the changed code file does not match a change list number associated with the software suite build; and
  generating and caching a new software suite build.

14. The non-transitory computer-readable storage medium of claim 13, wherein the method further comprising:
  calculating a time interval which is a function of a difference between the latest change list number included in the changed code file and the change list number associated with the software suite build; and
  generating and caching the new software suite build based on the calculated time interval.

15. A computer system to perform fast building and testing a software suite with multiple software components, comprising:
  a processor; and
  a non-transitory computer-readable medium having stored thereon instructions that, in response to execution by the processor, cause the processor to:
  obtain a changed code file;
  identify a software component of the software suite impacted by the changed code file;
  instruct to generate a software component build based on the software component but excluding other software components of the software suite;
  before completing generating the software component build, select a software suite build; and
  instruct to prepare a testbed based on the software suite build; and
  instruct to test the software component build on the testbed.

16. The computer system of claim 15, wherein the instructions, in response to execution by the processor, cause the processor to instruct to prepare the testbed after completing generating the software component build.

17. The computer system of claim 15, wherein the instructions, in response to execution by the processor, cause the processor to identify the software component based on a dependency graph of a build target of the changed code file.

18. The computer system of claim 15, wherein the non-transitory computer-readable medium having stored thereon additional instructions that, in response to execution by the processor, cause the processor to identify a branch of the changed code file based on a latest change list number included in the changed code file.

19. The computer system of claim 18, wherein the non-transitory computer-readable medium having stored thereon additional instructions that, in response to execution by the processor, cause the processor to:
  determine that a build target of the branch is a part of the software suite; and
  generate and cache a new software suite build.

20. The computer system of claim 18, wherein the non-transitory computer-readable medium having stored thereon additional instructions that, in response to execution by the processor, cause the processor to:
  determine that the latest change list number included in the changed code file does not matching a change list number associated with the software suite build; and
  generate and cache a new software suite build.

21. The computer system of claim 20, wherein the non-transitory computer-readable medium having stored thereon additional instructions that, in response to execution by the processor, cause the processor to:
  calculate a time interval which is a function of a difference between the latest change list number included in the changed code file and the change list number associated with the software suite build; and
  generate and cache the new software suite build based on the calculated time interval.

* * * * *